United States Patent
Kitagawa et al.

(10) Patent No.: US 6,419,875 B1
(45) Date of Patent: Jul. 16, 2002

(54) METHOD FOR PRODUCING BETA-ALUMINA SOLID ELECTROLYTE

(75) Inventors: Toshiji Kitagawa, Hashima-gun; Masaharu Kajita, Tajimi, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/994,124

(22) Filed: Nov. 26, 2001

(30) Foreign Application Priority Data

Dec. 11, 2000 (JP) ......................................... 2000-375677
Oct. 16, 2001 (JP) ......................................... 2001-318545

(51) Int. Cl.$^7$ ........................... C04B 35/03; C04B 35/04
(52) U.S. Cl. ....................... 264/618; 264/681; 501/119; 501/120; 429/320
(58) Field of Search ................................. 264/618, 681; 501/108, 109, 118, 119, 120, 153; 429/320

(56) References Cited

U.S. PATENT DOCUMENTS

| | | | |
|---|---|---|---|
| 5,229,340 A | * | 7/1993 | Nemoto et al. ............. 501/119 |
| 5,510,210 A | * | 4/1996 | Kim .......................... 429/193 |
| 5,545,495 A | * | 8/1996 | Kato .......................... 429/193 |
| 5,612,154 A | | 3/1997 | Kajita et al. |
| 5,691,082 A | | 11/1997 | Kajita et al. |

FOREIGN PATENT DOCUMENTS

| | | |
|---|---|---|
| JP | 2001-139367 | 5/2001 |
| JP | 2001-151562 | 6/2001 |

* cited by examiner

*Primary Examiner*—Christopher A. Fiorilla
(74) *Attorney, Agent, or Firm*—Burr & Brown

(57) ABSTRACT

There is provided a method for producing a beta-alumina solid electrolyte without calcination of starting materials, according to which the step of synthesizing a magnesium-aluminum spinel starting material is not needed and a beta-alumina solid electrolyte of low resistance can be produced at lower cost. According to this method, the beta-alumina solid electrolyte is produced without carrying out calcination of the starting materials by granulating a slurry obtained by milling and mixing starting materials of an aluminum source, a magnesium source and a sodium source in water, molding the granulated product and then firing the molded product. In this method, magnesium hydroxide is used as the magnesium source and an active spinel high in reactivity is synthesized in the course of firing, and citric acid is added to the slurry as a dispersing agent.

9 Claims, 1 Drawing Sheet

METHOD FOR PRODUCING BETA-ALUMINA SOLID ELECTROLYTE

BACKGROUND OF THE INVENTION

The present invention relates to a method for producing beta-alumina solid electrolytes, and, more particularly, to a method for producing beta-alumina solid electrolytes without using magnesium-aluminum spinel which has been widely used as a magnesium source.

Beta-alumina is expected to be used as solid electrolytes such as partition walls between a positive electrode chamber and a negative electrode chamber of sodium-sulfur batteries because it is very high in ionic conductivity (namely, low in electrical resistance) of sodium ion.

Among the beta-alumina solid electrolytes, MgO-stabilized beta-alumina solid electrolytes have hitherto been produced by the following methods. That is, MgO, an Na compound and an $\alpha$-$Al_2O_3$ as starting materials are mixed at an appropriate ratio, followed by calcining the mixture to make a beta-alumina and milling it. Then, the resulting materials are subjected to granulation, then molded into a desired shape and fired to obtain a beta-alumina solid electrolyte.

Furthermore, recently, as disclosed in JP-A-7-272749, there is a method of directly producing beta-alumina solid electrolytes without carrying out the calcining step in which the starting materials are converted to beta-alumina. This method is performed by using a spinel compound comprising magnesium and aluminum ($MgAl_2O_4$, hereinafter referred to as "magnesium-aluminum spinel") as a magnesium source for MgO which is a stabilizer for beta-alumina.

The above method which omits the calcining step of starting materials is useful in that beta-alumina solid electrolytes can be more efficiently produced by shortening the production steps, but suffers from the problem that production cost increases because a step of synthesizing magnesium-aluminum spinel starting material used as a magnesium source is needed.

SUMMARY OF THE INVENTION

The object of the present invention is to provide a method for producing a beta-alumina solid electrolyte without the step of calcining the starting materials wherein the step of synthesis of magnesium-aluminum spinel starting material is not needed and the beta-alumina solid electrolyte can be produced at lower cost.

According to the present invention, there is provided a method for producing a beta-alumina solid electrolyte without carrying out calcination of starting materials which comprises granulating a slurry obtained by milling and mixing starting materials of an aluminum source, a magnesium source and a sodium source in water, thereafter molding the granulated product, and then firing the resulting molded product, characterized in that magnesium hydroxide is used as the magnesium source and citric acid is added to the slurry as a dispersing agent.

In the present invention, it is preferred to keep the molded product at a given temperature for a given time in the course of the firing step. Specifically, it is preferred to keep the molded product for 1–5 hours at a temperature in the range of 900–1100° C. which is lower than the temperature at which $\beta$- or $\beta''$-alumina is synthesized, thereby converting to a spinel at least 10 mass % of the total amount of magnesium in the above magnesium hydroxide. As a result, an active spinel high in reactivity is produced in the course of firing, and a beta-alumina solid electrolyte of lower resistance can be obtained.

Moreover, amount of citric acid added to the slurry is preferably 0.01–1 mass % based on solid matter in the slurry, and the time of the addition of citric acid is preferably before milling and mixing for preparation of the slurry. Furthermore, it is preferred to use sodium carbonate and/or sodium hydrogencarbonate as the sodium source, and it is preferred that the maximum temperature of the firing is 1550–1650° C.

In the present invention, the term "beta-alumina" is a general term for $\beta$-$Al_2O_3$ ($Na_2O\ 11Al_2O_3$), $\beta''$-$Al_2O_3$ ($Na_2O\ 5Al_2O_3$), $\beta'''$-$Al_2O_3$, and the like, and particularly means those having a high content of $\beta''$-$Al_2O_3$, namely, those having so-called $\beta''$ ratio of 95% or higher.

DETAILED DESCRIPTION OF THE INVENTION

Figure 1:
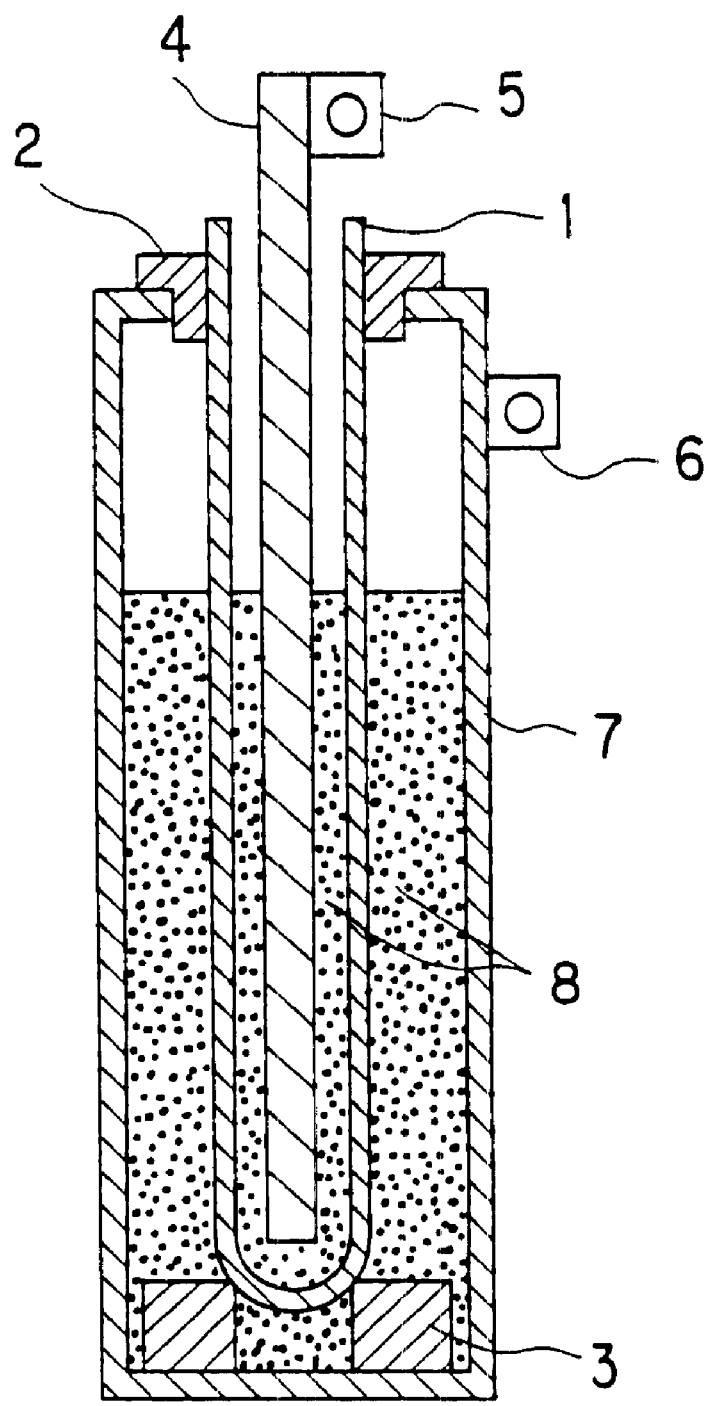
FIG. 1 shows a construction of an apparatus for Na/Na conductivity test which was used for measurement of electrical resistance.

The present invention has a great feature in that in the production of a beta-alumina solid electrolyte, magnesium hydroxide is used as the magnesium source for MgO which is a stabilizer for beta-alumina in place of magnesium-aluminum spinel which has been used in the conventional methods of producing beta-alumina solid electrolytes without carrying out calcination of starting materials. Thus, the step of synthesizing the magnesium-aluminum spinel starting material is omitted and a sharp reduction of production cost can be realized.

Furthermore, when magnesium hydroxide is used as the magnesium source, mixing ratio of the aluminum source increases as compared with when a magnesium-aluminum spinel is used, and hence it becomes possible to reduce resistance of the resulting beta-alumina solid electrolyte by using an alumina starting material of low electrical resistance as the aluminum source. As the alumina starting material of low electrical resistance, preferred is the alumina disclosed in JP-A-13-151562.

Moreover, in the present invention, during the firing step, the molded product is kept for 1–5 hours at a temperature in the range of 900–1100° C. which is lower than the temperature at which $\beta$- or $\beta''$-alumina is synthesized. Magnesium hydroxide is decomposed to water and active magnesia at a relatively low temperature of about 350° C. in the course of firing of the molded product, and the magnesia is changed to an active spinel through reactions with other starting material components by keeping the molded product at a temperature of 900–1100 ° C. for a given time, thereby finally being converted to beta-alumina. According to the present invention, due to the production of the active spinel high in reactivity in the course of the firing as mentioned above, the resulting beta-alumina solid electrolyte is further reduced in resistance and besides the firing temperature can be lowered as compared with the conventional production methods which use magnesium-aluminum spinel stable and low in reactivity as the magnesium source.

Amount of the spinel produced in the firing is preferably not less than 10 mass %, more preferably not less than 30 mass % based on the total amount of magnesium in magnesium hydroxide.

As to the firing temperature, the maximum firing temperature is about 1600° C. in the conventional methods which use magnesium-aluminum spinels as the magnesium sources while in the present invention, beta-alumina solid electrolytes having good characteristics can be obtained even if the maximum firing temperature is set in the range of 1550–1590° C. which is lower than that of the conventional methods. In the present invention, it is also possible to set the maximum temperature for firing at up to 1650° C.

In order to obtain beta-alumina solid electrolytes having good characteristics, it is important to mix the starting materials as uniformly as possible at the time of preparation of slurry for inhibiting segregation of each starting material in the granulated product. However, it is difficult to disperse magnesium hydroxide in the slurry, and, besides, viscosity of the slurry increases and it becomes difficult to control the viscosity at storage of the slurry or at the step of granulation.

Therefore, according to the present invention, citric acid is added to the slurry as a dispersing agent, thereby improving dispersibility of magnesium hydroxide and making it possible to perform uniform mixing of the starting materials to attain stabilization of viscosity at storage of the slurry or at the step of granulation. Amount of citric acid added to the slurry is preferably 0.01–1 mass % based on solid matter of the slurry. The time of the addition of citric acid is preferably before milling and mixing for preparing the slurry. This is because if citric acid is added after the milling and mixing, the effect to improve the dispersibility cannot sufficiently be developed.

Magnesium hydroxide used as the magnesium source in the present invention has an average particle diameter of preferably not more than 5 μm, especially preferably not more than 1 μm. When particle size of the magnesium hydroxide is in the above range, distribution of the magnesium source in the resulting slurry and granulated product becomes uniform and beta-alumina solid electrolytes having better characteristics can be obtained.

As sodium compounds for the sodium source, known compounds such as sodium carbonate ($Na_2CO_3$) can be used, but use of sodium hydrogencarbonate ($NaHCO_3$) is preferred because there occurs no segregation of sodium compound in the granulated product and uniform dispersion can be attained. That is, since $NaHCO_3$ is lower than $Na_2CO_3$ in solubility in solvents such as water, the former is higher in precipitation rate at the time of drying in granulation, and, as a result, uniform dispersion in the granulated product can be attained. Moreover, when the starting materials are mixed to prepare a slurry, pH of the slurry can be controlled to about 10 and, hence, latitude of selection of organic binders becomes greater. This is another preferred point for the use of $NaHCO_3$.

For the sodium source, there may be used the above sodium compounds each alone or in admixture of them.

As the aluminum.source, it is preferred to use $\alpha-Al_2O_3$. Particle size of $\alpha-Al_2O_3$ is preferably finer, and specifically the average particle diameter is preferably not more than 1 μm, especially preferably not more than 0.5 μm. Specific surface area of $\alpha-Al_2O_3$ is preferably not less than 5 $m^2/g$, more preferably not less than 10 $m^2/g$. When the particle size and the specific surface area of $\alpha-Al_2O_3$ are in the above ranges, coarse crystals are hardly produced in the resulting beta-alumina solid electrolytes, and those which are dense and low in resistance can be readily obtained.

The starting materials of the aluminum source, the magnesium source and the sodium source which have the above mentioned properties are added and mixed at such a given ratio as capable of producing beta-alumina. The addition and mixing are carried out by adding citric acid as a dispersing agent to each of the starting materials, followed by milling and mixing in water by a ball mill and the like, and thus a slurry for granulation is prepared. For improving sinterability at the firing step, it is desirable that the above mixing is carried out as uniformly as possible.

Then, the resulting slurry is subjected to granulation by a spray drier or the like. This granulation step is provided for attaining uniform mixing of the starting materials and improving moldability at the subsequent molding step. In the granulation step, a granulated product having an average particle diameter of usually 30–100 μm is prepared.

After the granulation of the slurry, the granulated product is molded into a given shape. For example, when the beta-alumina solid electrolyte of the present invention is used as a partition wall of sodium-sulfur batteries, it is usually molded into tubular shape. In this case, molding is carried out under a pressure of not less than 1.5 ton/$cm^2$, preferably not less than 2.0 tons/$cm^2$ to make a molded product having a density of not less than 1.9 g/$cm^3$.

Then, the molded product is fired under given conditions. For obtaining a beta-alumina having good characteristics and having a high β" ratio form, it is important to set the maximum temperature of the firing in the range of 1550–1650° C. More preferably, the firing schedule comprises at least four steps of (1) a step of keeping the molded product for 1–5 hours at a given temperature in the range of 900–1100° C. at which a spinel is synthesized from a-alumina and magnesia produced upon decomposition of magnesium hydroxide in the course of the firing, (2) a step of keeping the molded product for 1–5 hours at a given temperature in the range of 1400–1550° C. at which a phase change of from $\beta-Al_2O_3$ to $\beta"-Al_2O_3$ occurs or a step of raising the temperature at 50° C./hr or less in the above temperature range, (3) a step of keeping the molded product at a maximum temperature of 1550–1650° C. for 0.1–3.0 hours, and (4) a step of keeping the molded product for 1–5 hours at a given temperature in the range of 1400–1550° C. or a step of lowering the temperature at 50° C./hr or less in the above temperature range. Such the firing schedule satisfactorily acts for increasing the β" ratio form to 95% or higher.

EXAMPLES

The present invention will be explained in more detail by the following examples, which should not be construed as limiting the invention in any manner.

There were used a magnesium hydroxide ($Mg(OH)_2$) powder having an average particle diameter of 1.0 μm or a magnesium-aluminum spinel ($MgAl_2O_4$) powder having an average particle diameter of 1.0 μm as a magnesium source, an α-alumina powder having an average particle diameter of 1.5 μm and a specific surface area of 3.5 $m^2/g$ as an aluminum source, and a sodium carbonate ($Na_2CO_3$) powder of special grade chemical alone or together with a sodium hydrogencarbonate ($NaHCO_3$) powder of special grade chemical as a sodium source, and these were formulated so as to give such a ratio as capable of producing beta-alumina. Furthermore, citric acid in an amount as shown in Table 1 was added, followed by uniformly milling and mixing in water by a ball mill to prepare a slurry.

Then, the resulting slurry was granulated by a spray drier to obtain a granular product having an average particle diameter of 50 μm, and then the granular product was molded into a tubular product of 25 mmφ in diameter, 230 mm in length and 1.3 mm in thickness under a pressure of 2 tons/cm$^2$ by isostatic press. Then, the molded product in the state of being stored in a crucible made of MgO was fired for 60 minutes under conditions of a spinel synthesizing temperature, a keeping time and a synthesis ratio as shown in Table 1 and at a firing temperature (maximum firing temperature) as shown in Table 1 to obtain beta-alumina sintered products (beta-alumina solid electrolyte tubes) of Examples 1–14 and Comparative Examples 1–5. Electrical resistance, burst strength to internal pressure and density of the resulting sintered products were measured and the results are shown in Table 1. The electrical resistance and the burst strength to internal pressure were measured by the following methods.

(Method of Measurement of Electrical Resistance)

An Na/Na conductivity testing apparatus as shown in FIG. 1 was made and the electrical resistance was measured at 350° C. In FIG. 1, the Na/Na conductivity testing apparatus comprises a tubular beta-alumina sintered product (beta-alumina solid electrolyte tube) 1, insulating supports 2 and 3 made of α-Al$_2$O$_3$, an electrode 4 made of stainless steel, and electrode removing ports 5 and 6, and electrical resistance of the beta-alumina solid electrolyte tube 1 was obtained as resistivity by charging molten sodium 8 of 350° C. in a container 7 and the beta-alumina solid electrolyte tube 1, and passing a constant electric current between the electrode removing ports 5 and 6.

(Method of Measurement of Burst Strength to Internal Pressure)

A hydraulic pressure was applied to the internal wall of the tubular beta-alumina sintered product (beta-alumina solid electrolyte tube) through a rubber tube, and the burst strength to internal pressure was measured from hydraulic pressure value at which the beta-alumina solid electrolyte tube was broken and size of the beta-alumina solid electrolyte tube.

As can be seen from the results of Table 1, the beta-alumina tubes of Examples 1–14 which were produced by the method of the present invention had strength and density similar to those of the beta-alumina tubes of Comparative Examples 1–3 which were produced using a magnesium-aluminum spinel as the magnesium source and showed electrical resistance lower than that of the beta-alumina tubes of Comparative Examples 1–3. Moreover, the beta-alumina tube of Comparative Example 4 which was produced without adding citric acid to the slurry was inferior in characteristics to the beta-alumina tubes of Examples 1–14. Thus, it was confirmed that the addition of citric acid as a dispersing agent was important in the case of using magnesium hydroxide as a magnesium source. Furthermore, the beta-alumina tubes of Comparative Example 5 which was produced without synthesizing a spinel in the course of firing showed higher electrical resistance than that of the beta-alumina tubes of Examples 1–14.

As explained above, according to the production method of the present invention, since the magnesium source is provided in the form of magnesium hydroxide, the step for synthesis of magnesium-aluminum spinel starting material used hitherto as the magnesium source can be omitted and the production cost can be sharply reduced. Furthermore, in the case of using magnesium hydroxide as the magnesium source, the mixing ratio of the aluminum source increases as compared with the case of using magnesium-aluminum spinel, and, as a result, resistance of the beta-alumina solid electrolytes can be reduced by using an alumina starting material of low electrical resistance as the aluminum source.

Furthermore, in the present invention, an active spinel high in reactivity is produced in the course of firing at a temperature lower than a temperature at which β- or β"-alumina is synthesized, and, therefore, the beta-alumina solid electrolytes can be further reduced in resistance, and, besides, in the present invention, the maximum temperature

TABLE 1

| | Mg source | Na source *2 | Amount of citric acid (mass %) | Temperature for synthesis of spinel (° C.) | Keeping time for synthesis of spinel (hr) | Synthesis ratio of spinel in firing (%) | Firing temperature (° C.) | Electric resistance (Ω cm) | Burst strength to internal pressure (MPa) | Density (g/cm$^3$) |
|---|---|---|---|---|---|---|---|---|---|---|
| Example 1 | Mg(OH)$_2$ | A | 0.01 | 1000 | 3 | 30 | 1570 | 2.2 | 200 | 3.22 |
| Example 2 | Mg(OH)$_2$ | A | 0.05 | 1000 | 3 | 30 | 1570 | 2.0 | 210 | 3.24 |
| Example 3 | Mg(OH)$_2$ | A | 0.1 | 1000 | 3 | 30 | 1570 | 2.0 | 230 | 3.24 |
| Example 4 | Mg(OH)$_2$ | A | 0.5 | 1000 | 3 | 30 | 1570 | 2.2 | 220 | 3.23 |
| Example 5 | Mg(OH)$_2$ | A | 1.0 | 1000 | 3 | 30 | 1570 | 2.3 | 200 | 3.22 |
| Example 6 | Mg(OH)$_2$ | A | 1.5 | 1000 | 3 | 30 | 1570 | 2.5 | 180 | 3.2 |
| Example 7 | Mg(OH)$_2$ | A | 0.1 | 1000 | 3 | 30 | 1550 | 2.5 | 190 | 3.21 |
| Example 8 | Mg(OH)$_2$ | A | 0.1 | 1000 | 3 | 30 | 1590 | 2.0 | 210 | 3.24 |
| Example 9 | Mg(OH)$_2$ | A | 0.1 | 1000 | 3 | 30 | 1600 | 2.0 | 200 | 3.24 |
| Example 10 | Mg(OH)$_2$ | A + B | 0.1 | 1000 | 3 | 30 | 1570 | 1.9 | 250 | 3.24 |
| Example 11 | Mg(OH)$_2$ | A | 0.1 | 950 | 3 | 10 | 1570 | 2.5 | 230 | 3.24 |
| Example 12 | Mg(OH)$_2$ | A | 0.1 | 1050 | 3 | 55 | 1570 | 1.9 | 210 | 3.23 |
| Example 13 | Mg(OH)$_2$ | A | 0.1 | 1000 | 1 | 10 | 1570 | 2.4 | 220 | 3.24 |
| Example 14 | Mg(OH)$_2$ | A | 0.1 | 1000 | 5 | 50 | 1570 | 1.9 | 220 | 3.23 |
| Comparative Example 1 | MgAl$_2$O$_4$ | A | No | No | No | *1 | 1600 | 3.5 | 180 | 3.22 |
| Comparative Example 2 | MgAl$_2$O$_4$ | A | 0.1 | No | No | *1 | 1600 | 3.0 | 210 | 3.22 |
| Comparative Example 3 | MgAl$_2$O$_4$ | A + B | 0.1 | No | No | *1 | 1600 | 2.7 | 200 | 3.24 |
| Comparative Example 4 | Mg(OH)$_2$ | A | No | 1000 | 3 | 30 | 1570 | 2.8 | 150 | 3.18 |
| Comparative Example 5 | Mg(OH)$_2$ | A | 0.1 | No | No | 0 | 1570 | 2.8 | 220 | 3.23 |

*1 The total amount of magnesium was added in the form of spinel as starting material.
*2 A: Sodium carbonate
B: Sodium hydrogencarbonate

What is claimed is:

1. A method for producing a beta-alumina solid electrolyte comprising granulating a slurry obtained by milling and mixing starting materials of an aluminum source, a magnesium source and a sodium source in water, molding the granulated product and then firing the molded product without calcination of the starting materials, characterized in that magnesium hydroxide is used as the magnesium source and citric acid is added to the slurry as a dispersing agent.

2. A method for producing a beta-alumina solid electrolyte according to claim 1, wherein a spinel is synthesized from at least 10 mass % of the total amount of magnesium in the magnesium hydroxide in the course of firing.

3. A method for producing a beta-alumina solid electrolyte according to claim 2, wherein the maximum temperature of firing is 1550–1650° C.

4. A method for producing a beta-alumina solid electrolyte according to claim 1, wherein in the course of firing the molded product is kept for 1–5 hours at a temperature in the range of 900–1100° C. which is lower than the temperature at which β- or β"-alumina is synthesized.

5. A method for producing a beta-alumina solid electrolyte according to claim 1, wherein the amount of citric acid added is 0.01–1 mass % based on the solid matter in the slurry.

6. A method for producing a beta-alumina solid electrolyte according to claim 4, wherein citric acid is added before the milling and mixing of the starting materials for preparing the slurry.

7. A method for producing a beta-alumina solid electrolyte according to claim 1, wherein citric acid is added before the milling and mixing of the starting materials for preparing the slurry.

8. A method for producing a beta-alumina solid electrolyte according to claim 1, wherein sodium carbonate and/or sodium hydrogencarbonate are used as the sodium source.

9. A method for producing a beta-alumina solid electrolyte according to claim 1, wherein the maximum temperature of firing is 1550–1650° C.

* * * * *